United States Patent Office 3,642,894
Patented Feb. 15, 1972

3,642,894
CATALYSTS FOR THE HYDRATION OF NITRILES TO AMIDES
Clarence E. Habermann, Ralph E. Friedrich, and Ben A. Tefertiller, Midland, Mich., assignors to The Dow Chemical Company, Midland, Mich.
No Drawing. Continuation-in-part of application Ser. No. 835,765, June 23, 1969. This application Dec. 5, 1969, Ser. No. 882,716
Int. Cl. C07c *103/00*
U.S. Cl. 260—561 N   6 Claims

ABSTRACT OF THE DISCLOSURE

Catalyst life and product quality in the catalytic hydration of nitriles to amides using reduced copper oxide or reduced copper chromite catalysts are improved by at least partially protecting the reduced catalysts from contact with oxygen after reduction.

BACKGROUND OF THE INVENTION

In prior applications cited below, reduced copper oxide and reduced copper chromite have been demonstrated to be useful heterogeneous catalysts for converting nitriles to the corresponding amide. The reduced catalysts were preferably prepared by contacting the copper oxide or copper chromite with hydrogen at an elevated temperature. Subsequent to the reduction, the catalysts were then exposed to oxygen gradually by mixing minor amounts of oxygen with an inert gas until the normal composition of oxygen in air was attained. Cupreous catalysts treated in such a manner were found to be extremely effective catalysts for converting nitriles to amides although colored impurities were occasionally observed in the product.

CROSS-REFERENCE TO RELATED APPLICATIONS

The present application is a continuation-in-part application of an application filed by Clarence E. Habermann and Ben A. Tefertiller, Ser. No. 835,765, filed June 23, 1969. The present application is a result of continuing work with heterogeneous catalysts for converting nitriles to the corresponding amide described in this previous application along with a prior application by the same applicants Ser. No. 791,807, filed Jan. 16, 1969.

SUMMARY OF THE INVENTION

According to the present invention, catalyst life and product quality in the catalytic hydrolysis of nitriles to the corresponding amide using reduced copper oxide or reduced copper chrominum oxide catalysts are improved by at least partially protecting the reduced catalyst from contact with oxygen after reduction.

In the preferred process of the invention, a copper oxide or copper chromite catalyst is reduced with hydrogen at a temperature of about 100° to 300° C. until about 5 to about 16% of the weight of the original unreduced catalyst is lost. After reduction, the catalyst is maintained under an inert atmosphere and placed in a reactor. A reactant feed of water and a nitrile is prepared, and oxygen dissolved in the feed is preferably removed by sparging the mixture with nitrogen. The reactor is heated, preferably to 70° to 85° C., the deoxygenated reactant mixture is fed into the reactor, and the corresponding amide is recovered from the product stream.

The catalysts of the present invention are reduced copper oxide or reduced copper-chromium oxide as described in the above copending applications. The copper oxide catalysts before reduction may suitably be cupric oxide, cuprous oxide or mixture of the two. The reduced copper oxide catalyst generally contains a major amount of elemental copper and minor amounts of cupreous oxide and cupric oxide.

The reduced copper-chromium oxide catalysts of the invention may be prepared by reducing copper chromite catalysts which are generally referred to as Adkins catalysts. The unreduced Adkins copper chromite catalysts may be prepared by a number of known methods, for example, by the decomposition of copper ammonium chromate, by the decomposition of copper ammonium chromium carbonates, or the decomposition of copper-chromium nitrates, or by grinding and heating together copper oxides and chromium oxides. Before reduction, the catalysts are generally considered to be mixtures of copper oxide and chromium oxide. The preferred copper chromite catalysts of the present invention consist essentially of 10 to 99 percent by weight of copper oxide and 1 to 90 percent by weight of chromium oxide before reduction. Copper chromite catalysts containing more than 50% by weight copper oxide before reduction are especially preferred.

Preparation of the reduced catalyst is generally accomplished by reducing copper oxide or copper chromite by an ordinary hydrogen reduction although other methods of reduction may be used. In such hydrogen reduction, the copper oxide or copper chromite is contacted with elemental hydrogen at an appropriate temperature to give the desired reduction.

In the reduction of copper oxide and copper chromite, the reaction conditions are generally adjusted to reduce only copper oxide, chromate ($Cr_2O_4^=$), dichromate ($Cr_2O_7^=$) and chromium trioxide ($CrO_3$). Cupric oxide is reduced to either cuprous oxide or elemental copper, and cuprous oxide may be at least partially reduced to elemental copper. The small amounts of chromate, dichromate and chrominum trioxide present are usually reduced to chromic oxide ($Cr_2O_3$).

In a hydrogen reduction, the inter-relationship of temperature, reaction time and quantity of hydrogen used controls the amount of reduction in the oxidation state to which the compounds are reduced. To reduce copper oxide, chromate, dichromate and chromium trioxide, temperatures of about 50° to about 500° C. or more may suitably be employed with temperatures of about 100° to about 300° C. being preferred. The reaction time and amount of hydrogen used may vary widely. As more reduction is desired, higher temperatures, longer reaction times and more hydrogen are employed.

The reduction of the copper oxide or copper chromite to the desired catalyst may be monitored and controlled by measuring the quantity of hydrogen absorbed, observing the amount of water formed in the reduction, or by determining the weight loss of the catalyst. The weight loss for each individual catalyst may vary widely as different catalysts are employed, but catalysts losing about 2 to about 20% of their weight during a hydrogen reduction are preferred, with catalysts losing about 5 to about 16% of their weight being especially preferred. In any event, the weight loss giving optimum activity for a particular catalyst may be easily determined by experience.

Although the reduction of the copper oxide and copper chromite with hydrogen is preferred, other methods of reduction may also be employed to prepare the reduced catalyst. For example, the catalyst may be prepared by contacting the copper oxide or copper chromite at an elevated temperature with ammonia, hydrazine, carbon, carbon monoxide, a lower alkane, a lower alkanol, or other reducing agent.

By any method of preparation of the reduced catalyst, the novel and inventive feature of the present invention is the at least partial exclusion of oxygen from the catalyst after reduction. By partial protection of the catalyst from oxygen is meant any degree of excluding oxygen from contact with the catalyst which gives a significantly longer catalyst life, a more active catalyst, or a better amide product. Such contact with air or other oxygen-containing gas should be especially avoided immediately after reduction of the catalyst. At this time, the reduced cupreous catalyst is most vulnerable to oxidation even at relatively low temperatures. Contact with air or an oxygen-containing gas may be avoided by beginning the reactant flow immediately after reduction or by maintaining the reduced catalyst under an essentialy oxygen-free atmosphere until the reaction is begun. Suitable inert atmospheres may consist essentially of nitrogen, helium, argon or other inert gas.

Removal of oxygen dissolved in the water-nitrile reactant feed which is contacted with the reduced cupreous catalyst is also beneficial. The oxygen dissolved in the reactant feed is usually present as a result of the contact of the feed solutions with air under ambient conditions. This removal may suitably be accomplished by bubbling nitrogen or another inert gas through the reactant feed prior to contact with the catalyst in order that the dissolved oxygen may be replaced or removed by the inert gas. Although the amount of oxygen removed from the reactant feed is minor in comparison to the amount of protection afforded by excluding direct air contact with the reduced catalyst, the exclusion of oxygen from the feed extends the catalyst life and in the long run improves the product quality.

The improved product quality and catalyst life resulting from the exclusion of oxygen may be seen when any nitrile is converted to the corresponding amide using a reduced cupreous catalyst. The conversion of aliphatic and aromatic hydrocarbon nitriles having up to about 20 or more carbon atoms by this process is preferred and the improvement in the conversion of acrylonitrile to acrylamide is of special interest.

Thus, by excluding oxygen from the reduced cupreous catalyst, longer catalyst life and better amide product result.

SPECIFIC EMBODIMENTS

Example 1.—Reduction and use of a catalyst containing 80% CuO and 17% $Cr_2O_3$ and the absence of oxygen 40.32 grams of an unreduced copper chromium oxide catalyst containing 80% CuO and 17% $Cr_2O_3$ sold under the trade name Harshaw Cu 0203 was ground and screened to obtain a particle size of about 20 to 50 mesh. The catalyst was reduced with a 2000 cc./min. gas flow containing 5% hydrogen and 95% nitrogen by volume for 6 hours at a temperature of 175° C. for the entire period. After reduction, the catalyst was maintained under a nitrogen atmosphere and not exposed to air at any time.

A continuous flow reactor was fabricated of stainless steel having a reaction chamber with a volume of 15 cc., a feed reservoir connected to the bottom of the reactor and a product container connected to the top of the reaction chamber. The reaction chamber was packed with 25.80 g. of the reduced catalyst in an inert atmosphere. A 7% solution of acrylonitrile in water was prepared and oxygen was excluded from the feed solution as well as being excluded from the nitrogen used to pressurize the feed solutions. The reactor was heated to a temperature of 75° C. and was operated for the first 75 hours at that temperature. From 75 hours of operation until 412 hours of operation, the temperature was maintained at 80° C. and from 412 hours of operation to almost 1,400 hours of operation, the temperature was maintained at 85° C. The feed solution was passed over the catalyst bed at a rate of 14±0.5 cc./hr. under sufficient pressure to maintain the liquid phase.

The reactor effluent was collected and cooled to room temperature. Samples were withdrawn from the product every 12 hours in bottles closed with rubber serum caps to prevent evaporation of the acrylonitrile and a sample was analyzed by gas-liquid chromatography using a weighed amount of dioxane as the internal standard.

Initially, the conversion of acrylonitrile was 96% with a 97% yield of acrylamide while no β-hydroxypropionitrile or other by-product was formed. During the first 1,000 hours of continuous operation with this catalyst, the conversion and yield were maintained at greater than 95% with no β-hydroxypropionitrile or other by-product being formed. From 1,000 hours to about 1,400 hours, the yield of acrylamide decreased from over 95% down to about 90% while the conversion of acrylonitrile was maintained at a level above 95%. The color of the reactor effluent was examined periodically during the course of the reaction and the product obtained was a colorless liquid at all times. In a parallel experiment, another portion of the same catalyst which had been exposed to air after reduction converted 66% of the acrylonitrile to acrylamide at 700 hours of operation and minor amounts of β-hydroxypropionitrile were formed.

EXAMPLE 2

Copper chromite sold under the trade name Harshaw Cu 0203 was reduced at 150° C. with hydrogen. One portion of the catalyst was exposed to air after reduction and the other was maintained under an inert atmosphere. The catalysts were placed in identical reactors maintained at a temperature of 85° C. and a 7% acrylonitrile in water solution was passed over the catalyst at a rate of 14 cc./hr. Nitrogen was bubbled through the feed solution going to catalyst that had been protected from air while no attempt was made to take oxygen out of the other feed solution. The acrylamide monomer obtained from the reactors was polymerized according to the following procedure: Aqueous solutions containing 15% acrylamide monomer were polymerized using 500 p.p.m. azobisisobutyronitrile catalyst, 1,000 p.p.m. of the tetrasodium salt of ethylenediaminetetraacetic acid, sold under the trade name Versene EDTA, and 1% sodium acetate. The solutions were adjusted to a pH of 5, deaerated and heated at 60° C. for 16 hours. The resulting gels were cut up and dissolved in water at a pH of 3.8 to make a 0.5% by weight solution of the polymer. The viscosities of these aqueous solutions were measured at 25° C. using an Ostwald-Fenske capillary viscometer. The polymer derived from the catalyst exposed to air had an average viscosity of 35 cps. for two polymerizations and the polymer derived from the catalyst protected from oxygen had a viscosity of 95 cps., thus demonstrating the higher purity of the latter.

In the same manner as described by the examples above, other catalysts of copper oxide and copper chromite containing from 10 to 99% by weight copper oxide and 1 to 90% by weight chromium oxide may be reduced and oxygen excluded from the catalyst during the conversion of acrylonitrile to acrylamide to obtain similar improved results.

Also in the same manner, other nitriles such as methacrylonitrile, crotonitrile, acetonitrile, adiponitrile and benzonitrile may be converted by the catalysts above to give improved catalyst life and higher conversions, yields and purities of the products.

We claim:
1. In the process for catalytically hydrating a nitrile to the corresponding amide by contacting a reactant feed of water and a nitrile with a reduced copper oxide or reduced copper chromite catalyst, the improvement comprising at least partially protecting the reduced catalysts from contact with oxygen after reduction.

2. The process of claim 1 wherein the reduced catalyst is protected from contact with an oxygen-containing gas.

3. The process of claim 1 wherein dissolved oxygen is removed from the reactant feed.

4. The process of claim 1 wherein the catalyst is reduced copper chromite which contained more than 50% by weight copper oxide before reduction.

5. The process of claim 1 wherein the nitrile is an aliphatic nitrile having up to 20 carbon atoms.

6. The process of claim 5 wherein the nitrile is acrylonitrile.

References Cited
UNITED STATES PATENTS 3,381,034    4/1968    Greene et al.  ------ 260—557

LEWIS GOTTS, Primary Examiner
E. G. LOVE, Assistant Examiner

U.S. Cl. X.R.
260—404, 561 R, 558 R

Disclaimer 3,642,894.—*Clarence E. Habermann, Ralph E. Friedrich,* and *Ben A. Tefertiller,* Midland, Mich. CATALYSTS FOR THE HYDRATION OF NITRILES TO AMIDES. Patent dated Feb. 15, 1972. Disclaimer filed Feb. 1, 1983, by the assignee, *The Dow Chemical Co.*

Hereby enters this disclaimer to claims 1–5 of said patent.

[*Official Gazette May 3, 1983.*]